United States Patent
Cantrell (10) Patent No.: US 9,016,306 B1
(45) Date of Patent: Apr. 28, 2015

(54) FREEZE FREE WALL HYDRANT MOUNTING DEVICE

(71) Applicant: Kevin E. Cantrell, Salem, IL (US)

(72) Inventor: Kevin E. Cantrell, Salem, IL (US)

(*) Notice: Subject to any disclaimer, the term of this patent is extended or adjusted under 35 U.S.C. 154(b) by 105 days.

(21) Appl. No.: 13/899,485

(22) Filed: May 21, 2013

Related U.S. Application Data (60) Provisional application No. 61/655,824, filed on Jun. 5, 2012.

(51) Int. Cl.
*E03B 9/02* (2006.01)
*F16L 5/00* (2006.01)

(52) U.S. Cl.
CPC .......................................... *F16L 5/00* (2013.01)

(58) Field of Classification Search
CPC ............. F16L 5/00; E03B 9/027; E03B 9/025
USPC ............... 137/301, 302, 59, 60, 61, 360, 359, 137/370, 375; 285/46, 64; 4/695
See application file for complete search history.

(56) References Cited

U.S. PATENT DOCUMENTS

| 536,801 | A | * | 4/1895 | Gaghan | 137/360 |
| 4,473,244 | A | * | 9/1984 | Hill | 285/14 |
| 5,603,347 | A | * | 2/1997 | Eaton | 137/360 |
| 6,668,852 | B1 | * | 12/2003 | Williamson | 137/312 |
| 7,055,863 | B1 | * | 6/2006 | Commeville et al. | 285/46 |
| 8,752,567 | B2 | * | 6/2014 | Brazeau | 137/15.02 |

* cited by examiner

*Primary Examiner* — Craig Schneider
*Assistant Examiner* — Kevin Barss
(74) *Attorney, Agent, or Firm* — Tipton L. Randall (57) ABSTRACT

A wall hydrant mounting device comprises a linear hollow conduit with a threaded connector at one end and an anchoring flange secured at the opposite end. The anchoring flange includes an anchoring section with an enlarged passageway connected to a hollow, cylindrical section. An adjustment cap fits within the enlarged passageway of the anchoring section. The adjustment cap contains a hollow cylindrical section in alignment with the hollow, cylindrical section of the anchoring flange. The wall hydrant mounting device is adapted for attachment of a water conduit to the threaded connector adjacent the end of the hollow conduit, and adapted for attachment of a wall hydrant to the threaded connector member. The wall hydrant is inserted through the adjustment cap, the hollow, cylindrical central section of the anchoring flange and through the hollow conduit fastened thereto.

20 Claims, 6 Drawing Sheets

FREEZE FREE WALL HYDRANT MOUNTING DEVICE

CROSS-REFERENCE TO RELATED APPLICATIONS, IF ANY

This application claims the benefit under 35 U.S.C. §119 (e) of provisional application Ser. No. 61/655,824, filed 5 Jun. 2012. Application Ser. No. 61/655,824 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to plumbing devices and, more particularly, to a wall hydrant mounting device, and, most particularly, to a wall hydrant mounting device that provides replacement of a freezless wall hydrant from the exterior of a building.

2. Background Information

A freeze free wall hydrant can freeze and rupture if it is not installed properly or if a hose remains connected to the hydrant during freezing weather. The rupture can cause water leakage in a crawl space or water damage within a wall or in a basement the next time the damaged hydrant is used. Also, the hydrant can wear out or malfunction due to normal use, resulting in similar problems. Any one of these failure conditions dictates the need to replace the hydrant, which can be a difficult and costly procedure. With currently available wall hydrants, access must be gained to the interior or back fitting of the hydrant to disconnect it from its water supply for the replacement process. Most of the time, the connection to the water supply was originally made during the construction of the structure and is usually difficult to access. The present invention solves this problem.

An exterior freeze free wall hydrant has a handle on the outside of a spigot structure with a long stem inside of a tube (measuring from 4" to 24" long) that opens and closes the water supply valve. The water supply valve can be located under the building, in a wall, in a basement ceiling, or some other location where the water valve is in a warm area. This prevents the wall hydrant from freezing in cold weather. Once shut off, the long tube is designed to drain out the water within it through the threaded spigot outlet, thus allowing the wall hydrant to function, even in the freezing temperatures. In some cases, a garden hose remains connected to the threaded spigot outlet in the fall and the hose does not allow the wall hydrant tube to drain out properly. When below freezing temperatures occur, the water inside of the tube can freeze, causing the tube to rupture. Since the location of the water shut off is upstream of the tube rupture point, no problem is noticed at the time. When the need to use the wall hydrant arises, and the water is turned on at the valve handle, water then leaks out of the ruptured area of the tube. If the wall hydrant tube is exposed in a crawl space, this results in a muddy area where the connection is accessed for hydrant replacement. If the wall hydrant is in a basement ceiling or in a wall, the water leakage can cause significant structural damage. This device of the present invention overcomes the short comings of the current freeze free wall hydrants. It allows a wall hydrant to be removed and reinstalled from the outside of the structure without the need to crawl under the building. In cases where the wall hydrant is concealed in a wall or basement ceiling, it will no longer be necessary to access the wall hydrant from inside of the structure in any way. Also, should the hydrant have ruptured, the present invention prevents leakage of water into the structure or under the building causing additional damage. The present invention expels the leaking water to the outside of the structure. This feature warns an individual of a ruptured hydrant and prevents any additional water damage.

Thus, there is an unmet need for a device that allows a freeze free wall hydrant to be disconnected from a water line and replaced from the exterior of a building.

Applicant has devised a wall hydrant mounting device that meets this need and allows a freeze free wall hydrant to be disconnected from a water line and replaced from the exterior of a building.

SUMMARY OF THE INVENTION

The invention is a wall hydrant mounting device comprising a linear hollow conduit member with first and second open ends. A double internally threaded connector member is secured within the hollow conduit member adjacent the second open end thereof and an anchoring flange member is secured to the first open end thereof. The anchoring flange member includes a hollow, cylindrical, central section fastened within the first open end of the linear hollow conduit member, and an anchoring section opposite the cylindrical central section forming an enlarged passageway connected to the hollow, cylindrical section of the flange member. An adjustment cap member slidably fits within the enlarged passageway of the anchoring section. The adjustment cap member contains a hollow, cylindrical section there through in alignment with the hollow, cylindrical, central section of the anchoring flange member. The wall hydrant mounting device is adapted for attachment of a water conduit to the threaded connector member adjacent the second open end of the hollow conduit member, and adapted for attachment of a wall hydrant to the threaded connector member. The wall hydrant is inserted through the hollow, cylindrical section of the adjustment cap member, the hollow, cylindrical central section of the anchoring flange member and through the hollow conduit member fastened thereto.

DESCRIPTION OF THE EMBODIMENTS

Nomenclature

10 Wall Hydrant Mounting Device
21 Hollow Conduit Member
22 First End of Hollow Conduit Member
24 Second End of Hollow Conduit Member
30 Double Threaded Connector Member
32 Internal Threads of Connector Member
35 End Cap Member for Second End of Conduit Member
40 Anchoring Flange Member
50 Cylindrical Section of Anchoring Flange Member
60 Anchoring Section of Anchoring Flange Member
62 Enlarged Passageway of Anchoring Flange Member
64 Anchoring Apertures of Anchoring Flange Member
66 Drain Notch of Anchoring Flange Member
68 Attachment Features of Anchoring Flange Member
70 Adjustment Cap Member
72 Cylindrical Section of Adjustment Cap Member
74 Mounting Apertures of Adjustment Cap Member
F Freeze Free Wall Hydrant
H Handle of Wall Hydrant
I Interior Tube of Wall Hydrant
S Spigot of Wall Hydrant
V Vent Cap of Wall Hydrant
W Exterior Wall of Structure
X Water Supply Line to Wall Hydrant Construction A wall hydrant mounting device comprising a linear hollow conduit member with first and second open ends. A double internally threaded connector member is secured within the hollow conduit member adjacent the second open end thereof and an anchoring flange member is secured to the first open end thereof. The anchoring flange member includes a hollow, cylindrical, central section fastened within the first open end of the linear hollow conduit member, and an anchoring section opposite the cylindrical central section forming an enlarged passageway connected to the hollow, cylindrical section of the flange member. An adjustment cap member slidably fits within the enlarged passageway of the anchoring section. The adjustment cap member contains a hollow, cylindrical section there through in alignment with the hollow, cylindrical, central section of the anchoring flange member. The wall hydrant mounting device is adapted for attachment of a water conduit to the threaded connector member adjacent the second open end of the hollow conduit member, and adapted for attachment of a wall hydrant to the threaded connector member. The wall hydrant is inserted through the hollow, cylindrical section of the adjustment cap member, the hollow, cylindrical central section of the anchoring flange member and through the hollow conduit member fastened thereto.

In a preferred embodiment, the wall hydrant mounting device comprising a linear hollow conduit member with first and second open ends. A double internally threaded connector member is secured within the hollow conduit member adjacent the second open end thereof and an anchoring flange member is secured to the first open end thereof. An anchoring flange member is secured to the first open end of the hollow conduit member. The anchoring flange member includes a hollow, cylindrical, central section fastened within the first open end of the linear hollow conduit member, and an anchoring section opposite the cylindrical central section forming an enlarged passageway connected to the hollow, cylindrical section of the flange member. The anchoring flange member also includes a plurality of anchoring apertures therein and a drain notch extending from the cylindrical central section to an outer edge of the anchoring section. An adjustment cap member slidably fits within the enlarged passageway of the anchoring section. The adjustment cap member has a hollow, cylindrical section there through in alignment with the hollow, cylindrical, central section of the anchoring flange member and a plurality of mounting apertures there through. The wall hydrant mounting device is adapted for attachment of a water conduit to the threaded connector member adjacent the second open end of the hollow conduit member, and adapted for attachment of a wall hydrant to the threaded connector member. The wall hydrant is inserted through the hollow, cylindrical section of the adjustment cap member, the hollow, cylindrical central section of the anchoring flange member and through the hollow conduit member fastened thereto.

Figure 1:
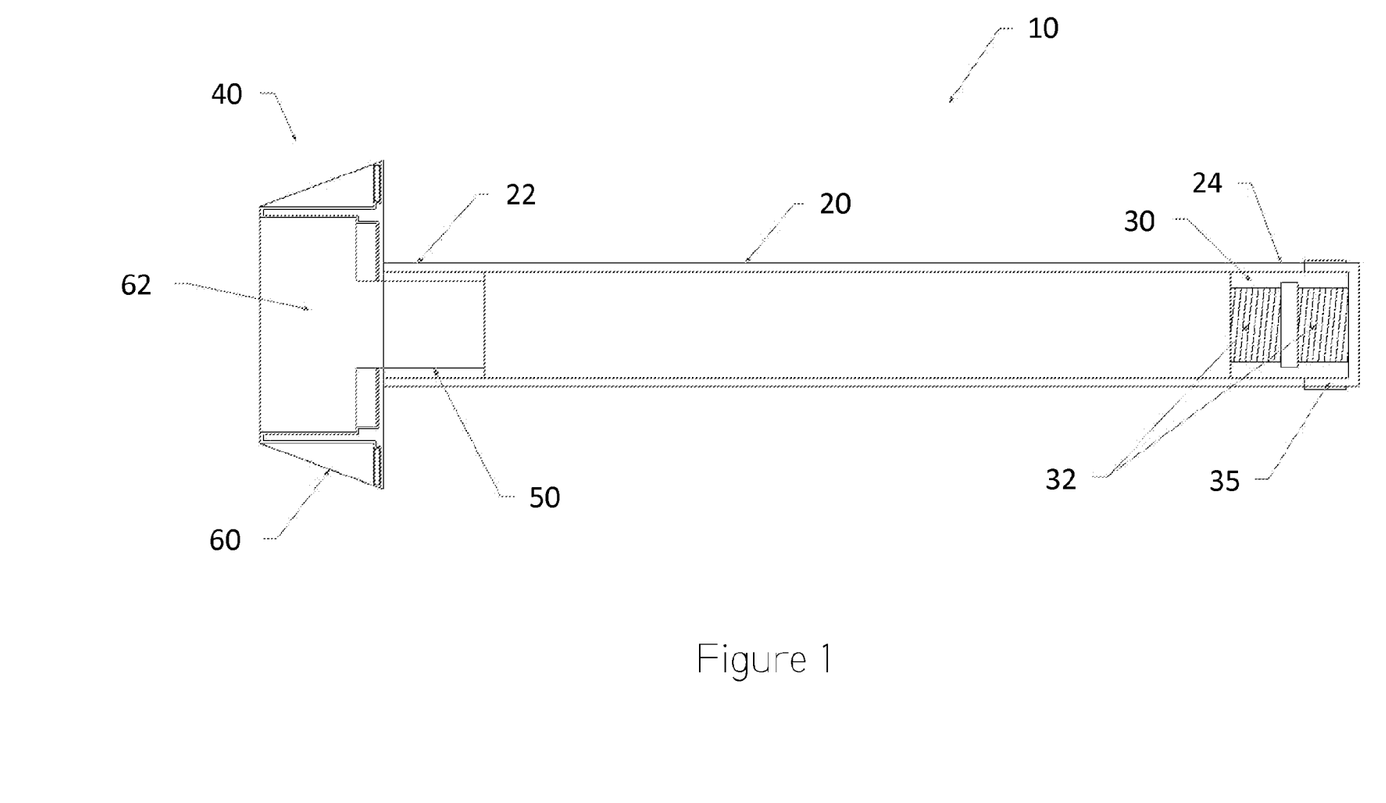
FIG. 1 is a sectional view of the hollow conduit member and anchoring flange member of the wall hydrant mounting device of the present invention.
Figure 2:
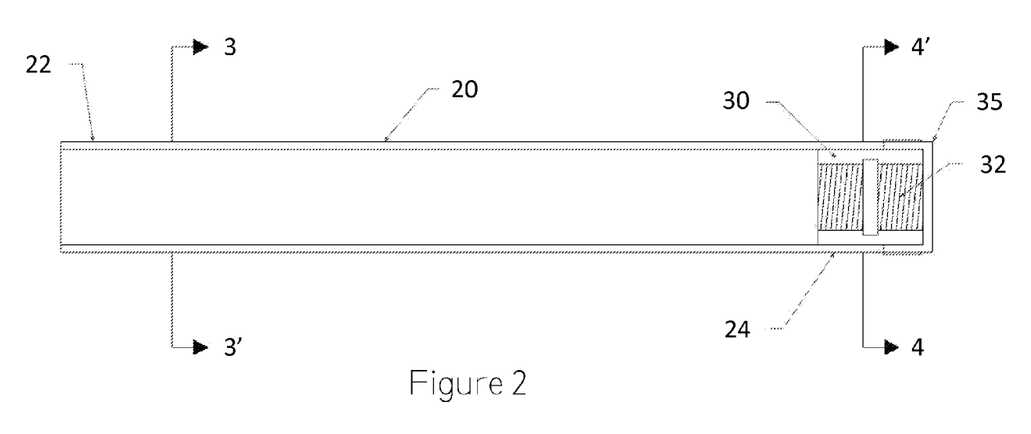
FIG. 2 is a sectional view of the hollow conduit member of the present invention.
Figure 3:
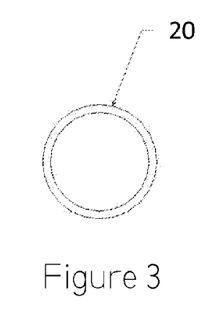
FIG. 3 is a sectional view along line 3-3' of FIG. 2 of the present invention.
Figure 4:
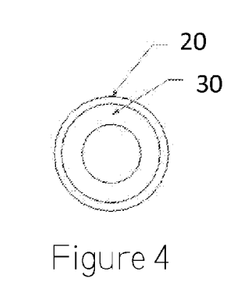
FIG. 4 is a sectional view along line 4-4' of FIG. 2 of the present invention.
Figure 5:
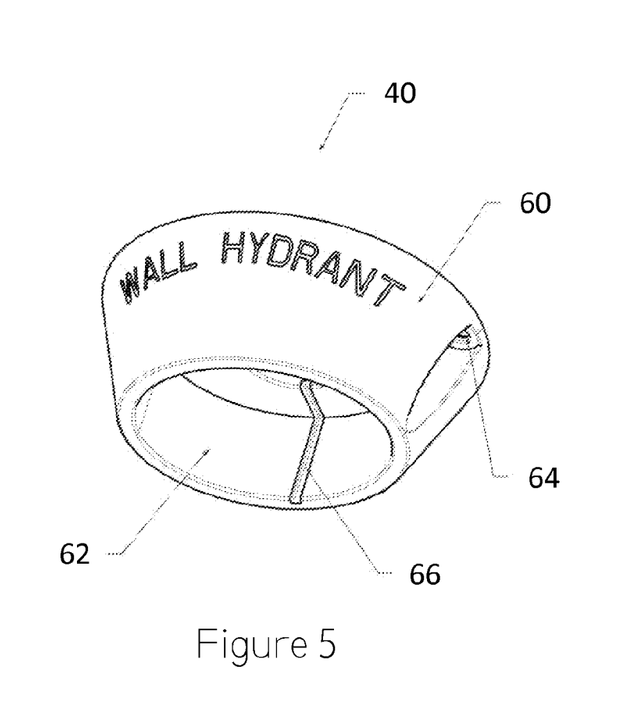
FIG. 5 is a front perspective view of the anchoring flange member of the present invention.
Figure 6:
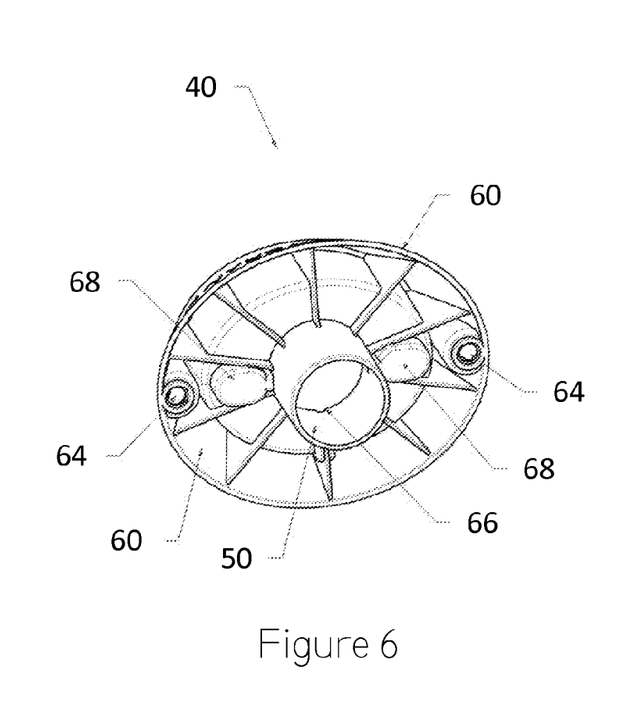
FIG. 6 is a rear perspective view of the anchoring flange member of the present invention.

Referring now to FIG. 1, a sectional view of the wall hydrant mounting device 10 is shown. The wall hydrant mounting device 10 includes a linear hollow conduit member 20, shown in FIG. 2, with a first open end 22 and a second open end 24. A double internally threaded connector member 30 is secured within the hollow conduit member 20 adjacent the second open end 24 thereof. An anchoring flange member 40 is secured to the first open end 22 of the hollow conduit member 20. Preferably, the anchoring flange member 40 is secured within the first open end 22 of the linear hollow conduit member 20. Referring now to FIGS. 5 and 6, the anchoring flange member 40 includes a hollow, cylindrical, central section 50 fastened within the first open end 22 of the linear hollow conduit member 20, and an anchoring section 60 opposite the cylindrical central section 50. The anchoring section 60 forms an enlarged passageway 62 connected to the hollow, cylindrical section 50 of the anchoring flange member 40.

Figure 7:
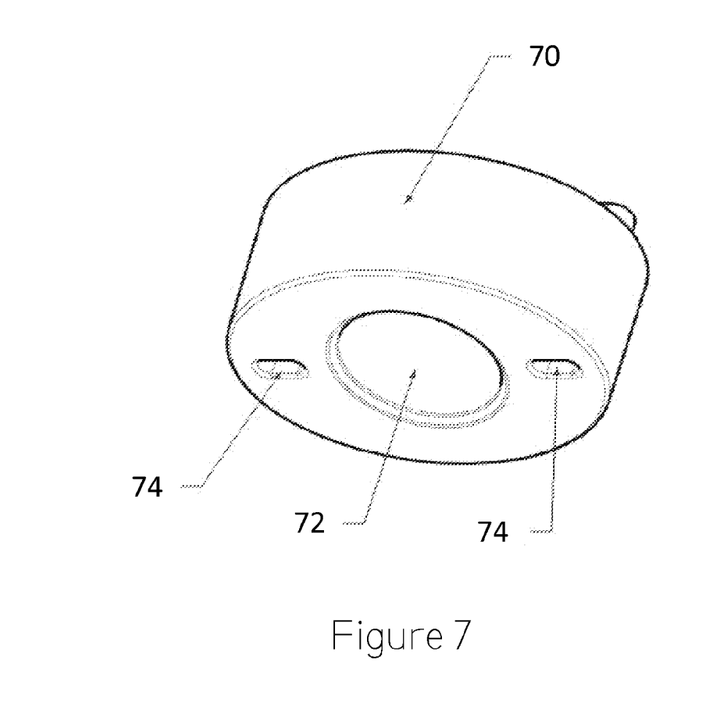
FIG. 7 is a front perspective view of the adjustment cap member of the present invention.
Figure 8:
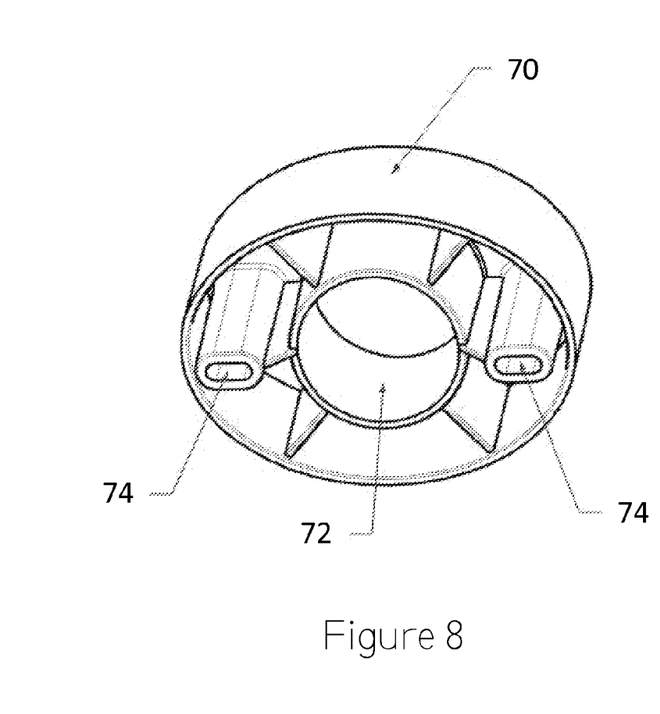
FIG. 8 is a rear perspective view of the adjustment cap member of the present invention.

The anchoring flange member 40 also includes a plurality of anchoring apertures 64 on the outer edge of the anchoring section 60. The anchor apertures 64 are adapted for securing the anchoring flange member 40 to the wall of a structure. In addition, a drain notch 66 extends from the cylindrical central section 50 to an outer edge of the anchoring section 60. The drain notch 66 allows water to drain from within the attached hollow conduit member 20. Should a user notice water flowing from the drain notch 66 when opening the freeze free water hydrant F, this is an indication of internal leakage and replacement of the freeze free water hydrant F is likely required. Referring now to FIGS. 7 and 8, an adjustment cap member 70 slidably fits within the enlarged passageway 62 of the anchoring section 60. Preferably, both the enlarged passageway 62 and the adjustment cap member 70 are non-circular, in this case both are oval. The adjustment cap member 70 has a hollow, cylindrical section 72 there through in alignment with the hollow, cylindrical, central section 50 of the anchoring flange member 40, allowing insertion of the threaded end of the freeze free water hydrant F there through.

Figure 9:
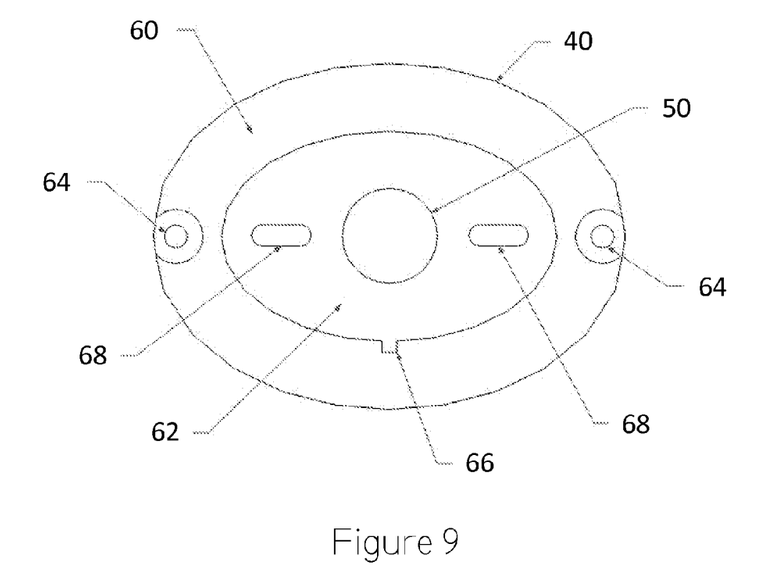
FIG. 9 is a front view of the anchoring flange member of the present invention.
Figure 10:
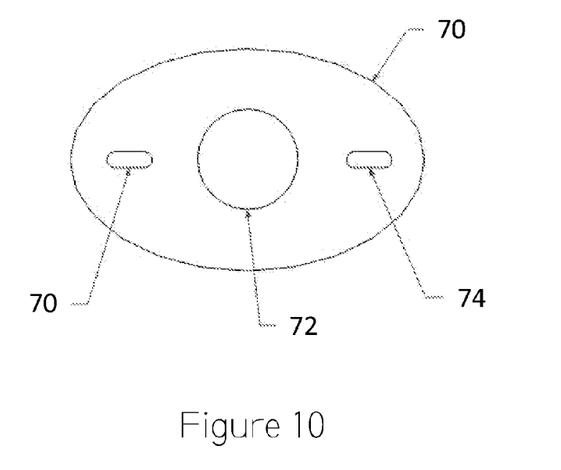
FIG. 10 is a front view of the adjustment cap member of the present invention.
Figure 11:
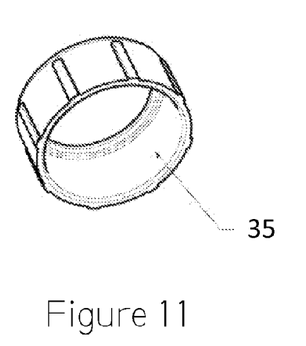
FIG. 11 is a perspective view of the end cap member of the present invention

The adjustment cap member 70 includes a plurality of mounting apertures 74 there through which are in register alignment with a like number of attachment features 68 of the anchoring flange member 40. The position of the mounting apertures 74 and the attachment features 60 are best seen in FIGS. 9 and 10, which show front views of the anchoring flange member 40 and the adjustment cap member 70, respectively. Thus, threaded fasteners (not shown) inserted through the mounting apertures 74 of the adjustment cap member 70 engage the attachment features 68 of the anchoring flange member 40 to adjust the position of the cap member 70 within the enlarged passageway 62 of the anchoring section 60.

An end cap member 35, shown in FIG. 10, is secured the second end 24 of the hollow conduit member 20, with the end cap member 35 contacting the internally threaded connector member 30 secured within the hollow conduit member 20. The end cap member 35 stabilizes the connection of the water supply line X to the threaded connector member 30.

The wall hydrant mounting device 10 is adapted for attachment of a water conduit X to the threaded connector member 30 adjacent the second open end 24 of the hollow conduit member 20, and adapted for attachment of a wall hydrant to the threaded connector member 30. The wall hydrant is inserted through the hollow, cylindrical section 72 of the adjustment cap member 70, through the hollow, cylindrical central section 50 of the anchoring flange member 40, and through the hollow conduit member 20 fastened thereto.

Preferably, the hollow conduit member 20, the threaded connector member 30, the anchoring flange member 50, and the adjustment cap member 70 are fabricated from polymeric resin plastic, such as polyvinyl chloride (PVC) plastic or Acrylonitrile Butadiene Styrene (ABS) plastic, for economy, ease of assembly and corrosion resistance.

In practice, the hollow conduit member 20, the anchoring flange member 40, and the adjustment cap member 70 are provided to the user as separate pieces. The hollow conduit member 20 has an original length of at least about 24 inches, sufficiently long to accommodate most commercially available freeze free wall hydrant units F. Prior to installing the wall hydrant mounting device 10 in the wall W of a structure, the installer adjusts the length of the hollow conduit member 20 by cutting off a portion at the first end 22 thereof. As mentioned above, all components of the wall hydrant mounting device 10 are fabricated from PVC or ABS plastic. Thus, the cylindrical section 50 of the anchoring flange member 40 is then readily glued or "welded" within the first end 22 of the shortened hollow conduit member 20 to provide a custom fit of the wall hydrant mounting device 10 for the freeze free wall hydrant unit F chosen for use.

Alternatively, the fully assembled wall hydrant mounting device 10 with the freeze free wall hydrant unit F secured there within is provided to the installer. The complete assembly of the mounting device 10 and wall hydrant unit F is inserted through an aperture in the wall W of a structure and connected to a water supply line X.

Figure 12:
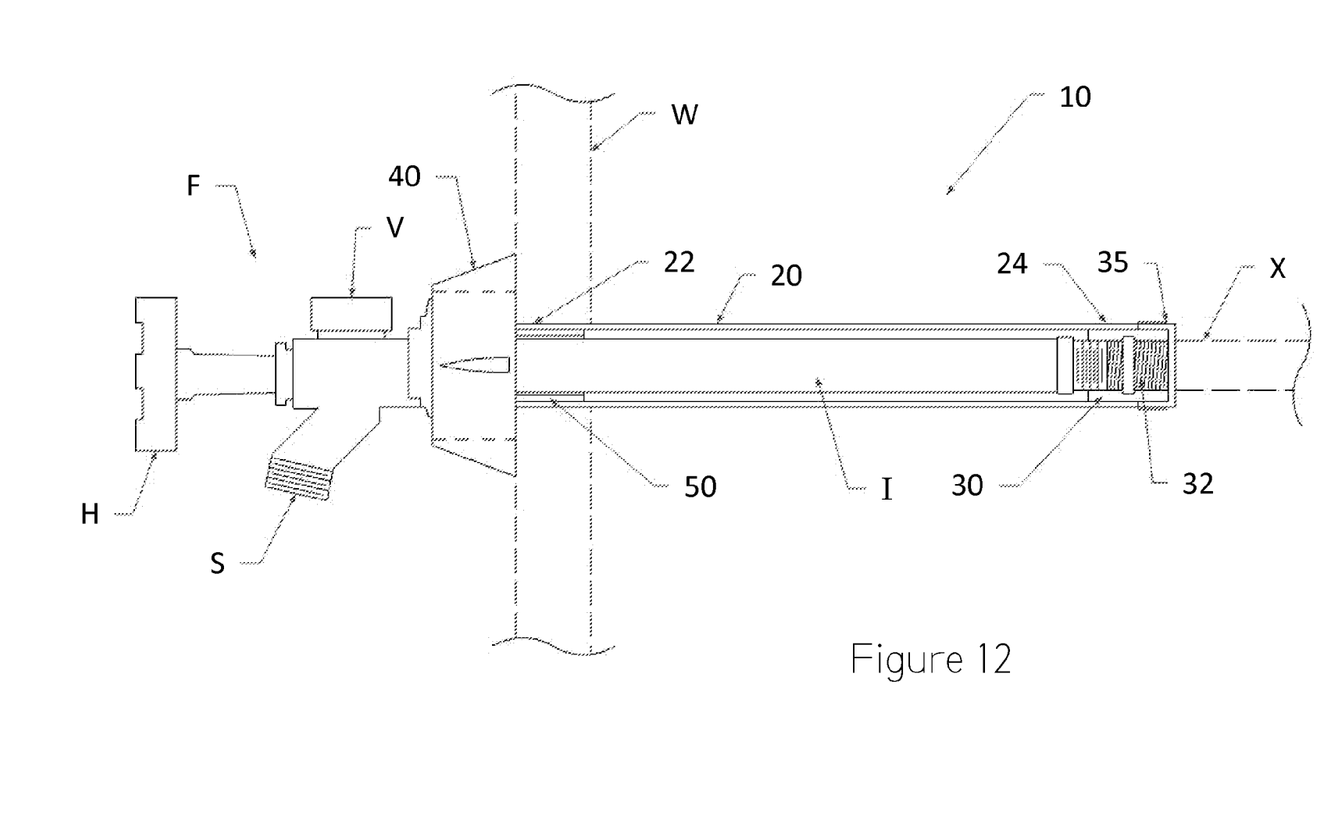
FIG. 12 is a sectional view of the fully assembled wall hydrant mounting device of the present invention installed in a wall of a structure with a freeze free wall hydrant contained therein.

Referring now to FIG. 12, the wall hydrant mounting device 10 is adapted for attachment of a water conduit X to one end of the threaded connector member 30 adjacent the second open end 24 of the hollow conduit member 20. The wall hydrant mounting device 10 is first inserted through an aperture in the wall of a structure, connected to the water conduit X, and the anchoring flange member 40 secured to the wall by inserting threaded fasteners (not shown) into the wall through the anchoring apertures 64 in the anchoring section 60. A wall hydrant F is the inserted through the cylindrical section 72 of the adjustment cap member 70, through the cylindrical section 50 of the anchoring flange member 40, and through the hollow conduit member 20 fastened thereto. The threaded end of the wall hydrant F is then fastened to the end of the threaded connector member 30 opposite the water conduit X. As disclosed above, threaded fasteners (not shown) inserted through apertures in the flange of the wall hydrant F, and through the aligned mounting apertures 74 of the adjustment cap member 70 engage the attachment features 68 of the anchoring flange member 40 to adjust the position of the cap member 70 within the enlarged passageway 62 of the anchoring section 60. Any gap between the flange of the wall hydrant F and the anchoring flange member 40 is taken up by the adjustment cap member 70.

While the invention has been particularly shown and described with reference to preferred embodiments thereof, it will be understood by those skilled in the art that various changes in form and details may be made therein without departing from the spirit and scope of the invention.

I claim:

1. A wall hydrant mounting device comprising:
   a linear hollow conduit member with first and second open ends;
   a double internally threaded connector member secured within the hollow conduit member adjacent the second open end thereof;
   an anchoring flange member secured to the first open end of the hollow conduit member, the anchoring flange member having a hollow, cylindrical, central section fastened within the first open end of the linear hollow conduit member, and an anchoring section opposite the cylindrical central section forming an enlarged passageway connected to the hollow, cylindrical section of the flange member; and
   an adjustment cap member slidably fitted within the enlarged passageway of the anchoring section, the adjustment cap member having a hollow, cylindrical section there through in alignment with the hollow, cylindrical, central section of the anchoring flange member;
   whereby the wall hydrant mounting device is adapted for attachment of a water conduit to the threaded connector member adjacent the second open end of the hollow conduit member and adapted for attachment of a wall hydrant to the threaded connector member, the wall hydrant inserted through the hollow, cylindrical section of the adjustment cap member, the hollow, cylindrical central section of the anchoring flange member and through the hollow conduit member fastened thereto.

2. The wall hydrant mounting device of claim 1, wherein the anchoring section of the anchoring flange member secured to the first open end of the linear hollow conduit member includes a plurality of anchoring apertures.

3. The wall hydrant mounting device of claim 1, wherein the adjustment cap member includes a plurality of mounting apertures there through.

4. The wall hydrant mounting device of claim 3, wherein the anchoring section of the anchoring flange member includes attachment features in alignment with the plurality of mounting apertures of the adjustment cap member.

5. The wall hydrant mounting device of claim 1, wherein the enlarged passageway of the anchoring flange member and the adjustment cap member fitted therein are non-circular.

6. The wall hydrant mounting device of claim 1, wherein the anchoring flange member includes a drain notch extending from the cylindrical central section to an outer edge of the anchoring section.

7. The wall hydrant mounting device of claim 1, further including an end cap member secured at the second end of the hollow conduit member, the end cap member contacting the internally threaded connector member secured within the hollow conduit member.

8. The wall hydrant mounting device of claim 7, wherein the linear hollow conduit member, the internally threaded connector member, the anchoring flange member and the adjustment cap member are fabricated from polymeric resin plastic.

9. A wall hydrant mounting device comprising:
a linear hollow conduit member with first and second open ends;
a double internally threaded connector member secured within the hollow conduit member adjacent the second open end thereof;
an anchoring flange member secured to the first open end of the hollow conduit member, the anchoring flange member having a hollow, cylindrical, central section fastened within the first open end of the linear hollow conduit member, and an anchoring section opposite the cylindrical central section forming an enlarged passageway connected to the hollow, cylindrical section of the flange member, the anchoring flange member including a drain notch extending from the cylindrical central section to an outer edge of the anchoring section; and
an adjustment cap member slidably fitted within the enlarged passageway of the anchoring section, the adjustment cap member having a hollow, cylindrical section there through in alignment with the hollow, cylindrical, central section of the anchoring flange member;
whereby the wall hydrant mounting device is adapted for attachment of a water conduit to the threaded connector member adjacent the second open end of the hollow conduit member and adapted for attachment of a wall hydrant to the threaded connector member, the wall hydrant inserted through the hollow, cylindrical section of the adjustment cap member, the hollow, cylindrical central section of the anchoring flange member and through the hollow conduit member fastened thereto.

10. The wall hydrant mounting device of claim 9, wherein the anchoring section of the anchoring flange member secured to the first open end of the linear hollow conduit member includes a plurality of anchoring apertures.

11. The wall hydrant mounting device of claim 9, wherein the adjustment cap member includes a plurality of mounting apertures there through.

12. The wall hydrant mounting device of claim 11, wherein the anchoring section of the anchoring flange member includes attachment features in alignment with the plurality of mounting apertures of the adjustment cap member.

13. The wall hydrant mounting device of claim 9, wherein the enlarged passageway of the anchoring flange member and the adjustment cap member fitted therein are non-circular.

14. The wall hydrant mounting device of claim 9, further including an end cap member secured at the second end of the hollow conduit member, the end cap member contacting the internally threaded connector member secured within the hollow conduit member.

15. The wall hydrant mounting device of claim 14, wherein the linear hollow conduit member, the internally threaded connector member, the anchoring flange member and the adjustment cap member are fabricated from polymeric resin plastic.

16. A wall hydrant mounting device comprising:
a linear hollow conduit member with first and second open ends;
a double internally threaded connector member secured within the hollow conduit member adjacent the second open end thereof;
an anchoring flange member secured to the first open end of the hollow conduit member, the anchoring flange member having a hollow, cylindrical, central section fastened within the first open end of the linear hollow conduit member, and an anchoring section opposite the cylindrical central section forming an enlarged passageway connected to the hollow, cylindrical section of the flange member, the anchoring flange member including a plurality of anchoring apertures therein and a drain notch extending from the cylindrical central section to an outer edge of the anchoring section; and
an adjustment cap member slidably fitted within the enlarged passageway of the anchoring section, the adjustment cap member having a hollow, cylindrical section there through in alignment with the hollow, cylindrical, central section of the anchoring flange member, the adjustment cap member having a plurality of mounting apertures there through;
whereby the wall hydrant mounting device is adapted for attachment of a water conduit to the threaded connector member adjacent the second open end of the hollow conduit member and adapted for attachment of a wall hydrant to the threaded connector member, the wall hydrant inserted through the hollow, cylindrical section of the adjustment cap member, the hollow, cylindrical central section of the anchoring flange member and through the hollow conduit member fastened thereto.

17. The wall hydrant mounting device of claim 16, wherein the anchoring section of the anchoring flange member includes attachment features in alignment with the plurality of mounting apertures of the adjustment cap member.

18. The wall hydrant mounting device of claim 16, wherein the enlarged passageway of the anchoring flange member and the adjustment cap member fitted therein are non-circular.

19. The wall hydrant mounting device of claim 16, further including an end cap member secured at the second end of the hollow conduit member, the end cap member contacting the internally threaded connector member secured within the hollow conduit member.

20. The wall hydrant mounting device of claim 19, wherein the linear hollow conduit member, the internally threaded connector member, the anchoring flange member and the adjustment cap member are fabricated from polymeric resin plastic.

\* \* \* \* \*